(12) United States Patent
Amanai

(10) Patent No.: US 7,006,305 B2
(45) Date of Patent: Feb. 28, 2006

(54) IMAGE FORMING OPTICAL SYSTEM AND ELECTRONIC INSTRUMENT USING THE SAME

(75) Inventor: Takahiro Amanai, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/820,148

(22) Filed: Apr. 8, 2004

(65) Prior Publication Data

US 2004/0246598 A1 Dec. 9, 2004

(30) Foreign Application Priority Data

Apr. 9, 2003 (JP) .............................. 2003-105285
Apr. 1, 2004 (JP) .............................. 2004-109328

(51) Int. Cl.
*G02B 9/12* (2006.01)
*G02B 9/14* (2006.01)
*G02B 15/14* (2006.01)

(52) U.S. Cl. ...................... 359/791; 359/790; 359/689; 359/784

(58) Field of Classification Search ................ 359/791, 359/689, 676, 683, 684, 790, 784, 779, 772
See application file for complete search history.

(56) References Cited

U.S. PATENT DOCUMENTS 6,236,515 B1 * 5/2001 Yamamoto et al. ......... 359/689

6,560,043 B1 5/2003 Saito et al. .................. 359/785
6,778,777 B1 * 8/2004 Fujii et al. ................... 396/535

FOREIGN PATENT DOCUMENTS

| JP | 05-188284 | 7/1993 |
| JP | 07-027974 | 1/1995 |
| JP | 09-288235 | 11/1997 |
| JP | 11-052227 | 2/1999 |

* cited by examiner

*Primary Examiner*—Tim Thompson
(74) *Attorney, Agent, or Firm*—Pillsbury Winthrop Shaw Pittman LLP

(57) ABSTRACT

An image forming optical system comprises, in order from an object side, a first positive meniscus lens having a convex surface directed toward an object side, an aperture stop, a second positive meniscus lens having a convex surface directed toward the object side and a negative lens. At least one of surfaces of the negative lens is a spherical and the following condition is satisfied:

$-2.0 < \Phi m/\Phi p < 0$ $-2.0 < (r1r + r2f)/(r1r - r2f) < 1.0$ where φm represents the power of the negative lens at the position of the maximum light height and φp represents the power of the negative lens at the position of the near axis, r1r represents the radius of curvature of the first lens at the image side and r2f is the radius of curvature of the second lens at the object side.

21 Claims, 10 Drawing Sheets

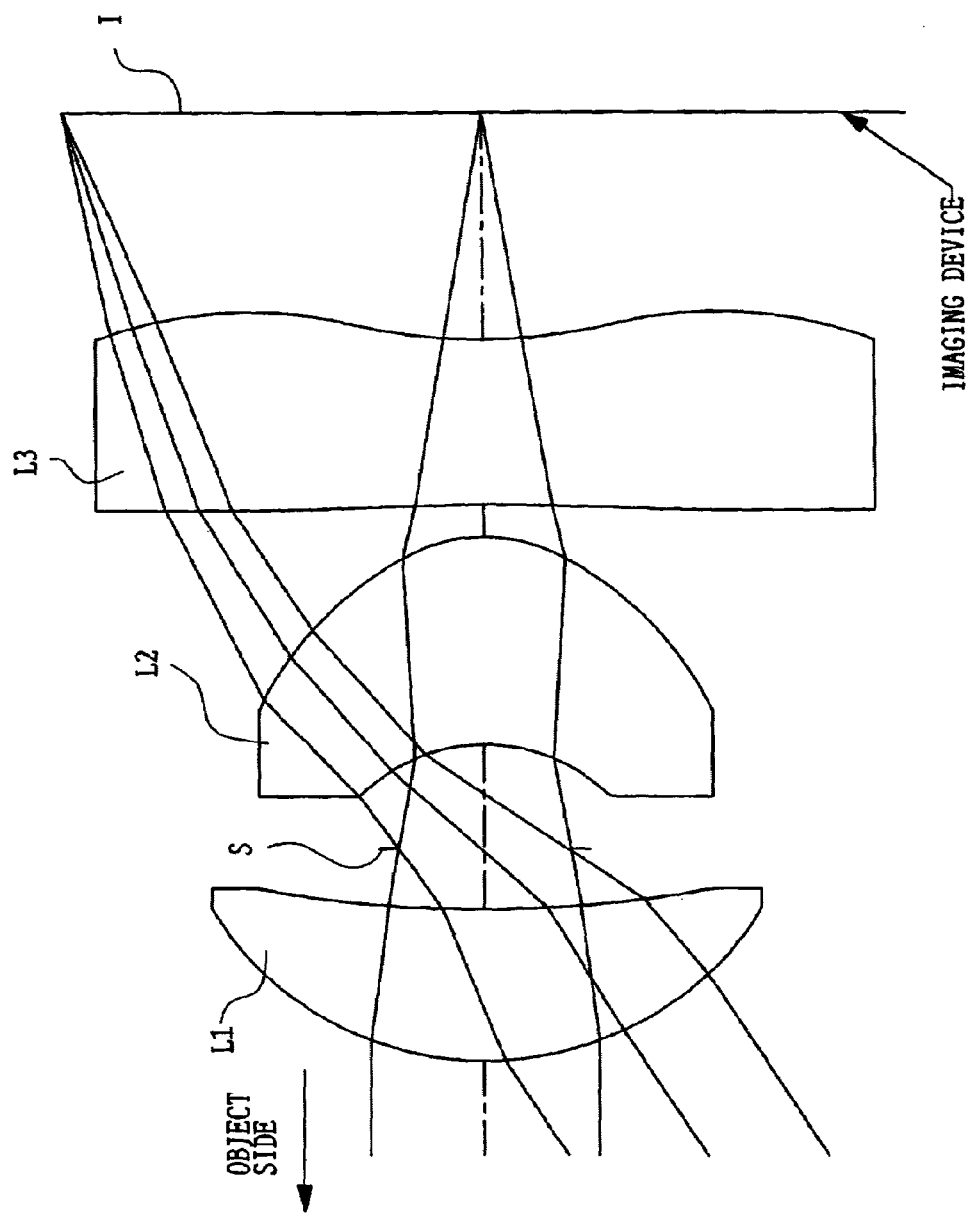

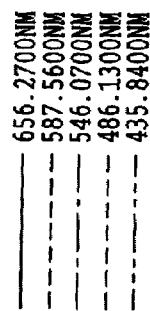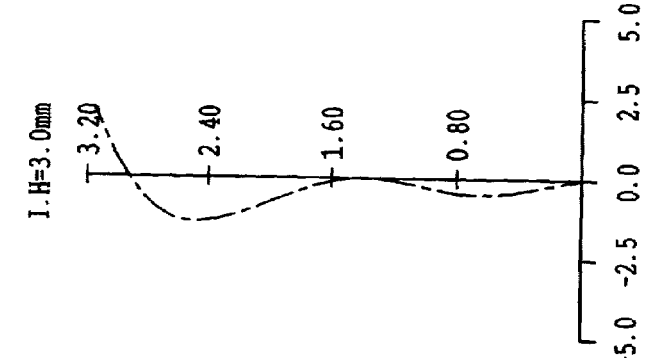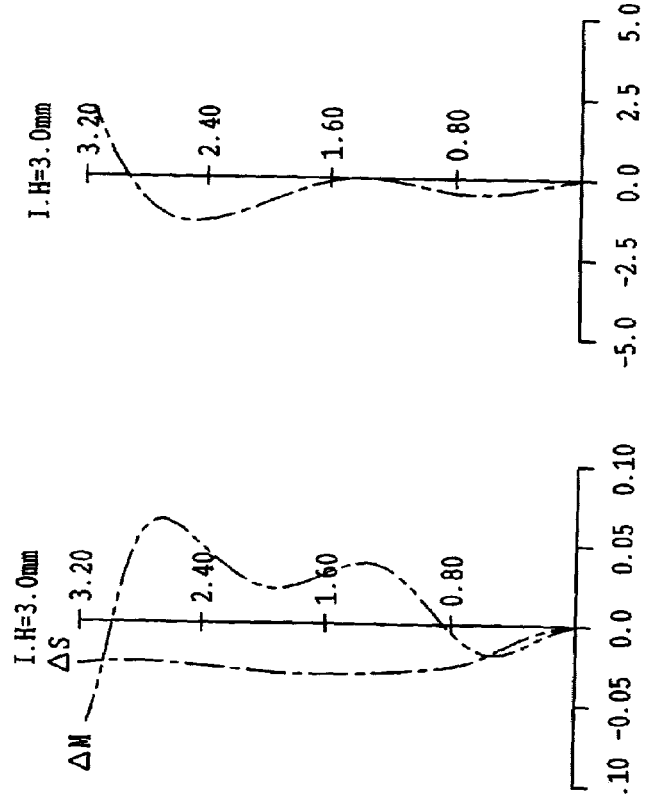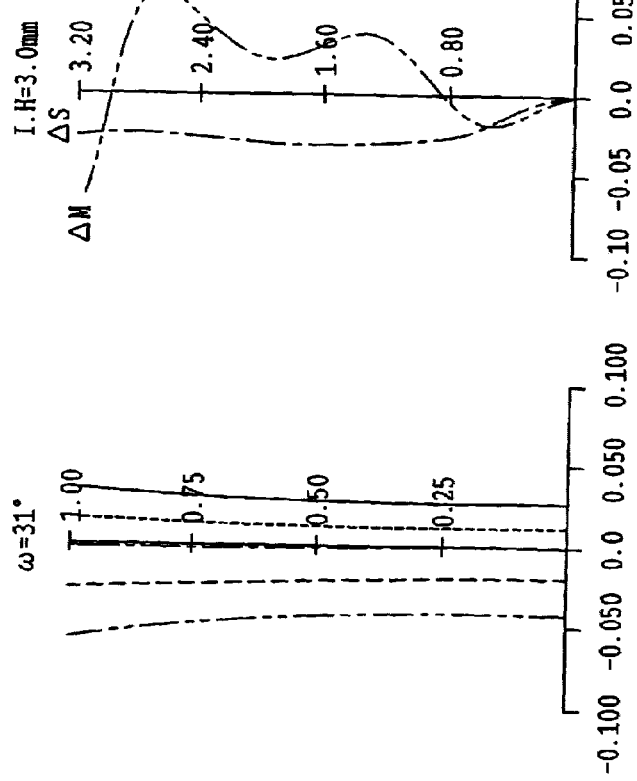

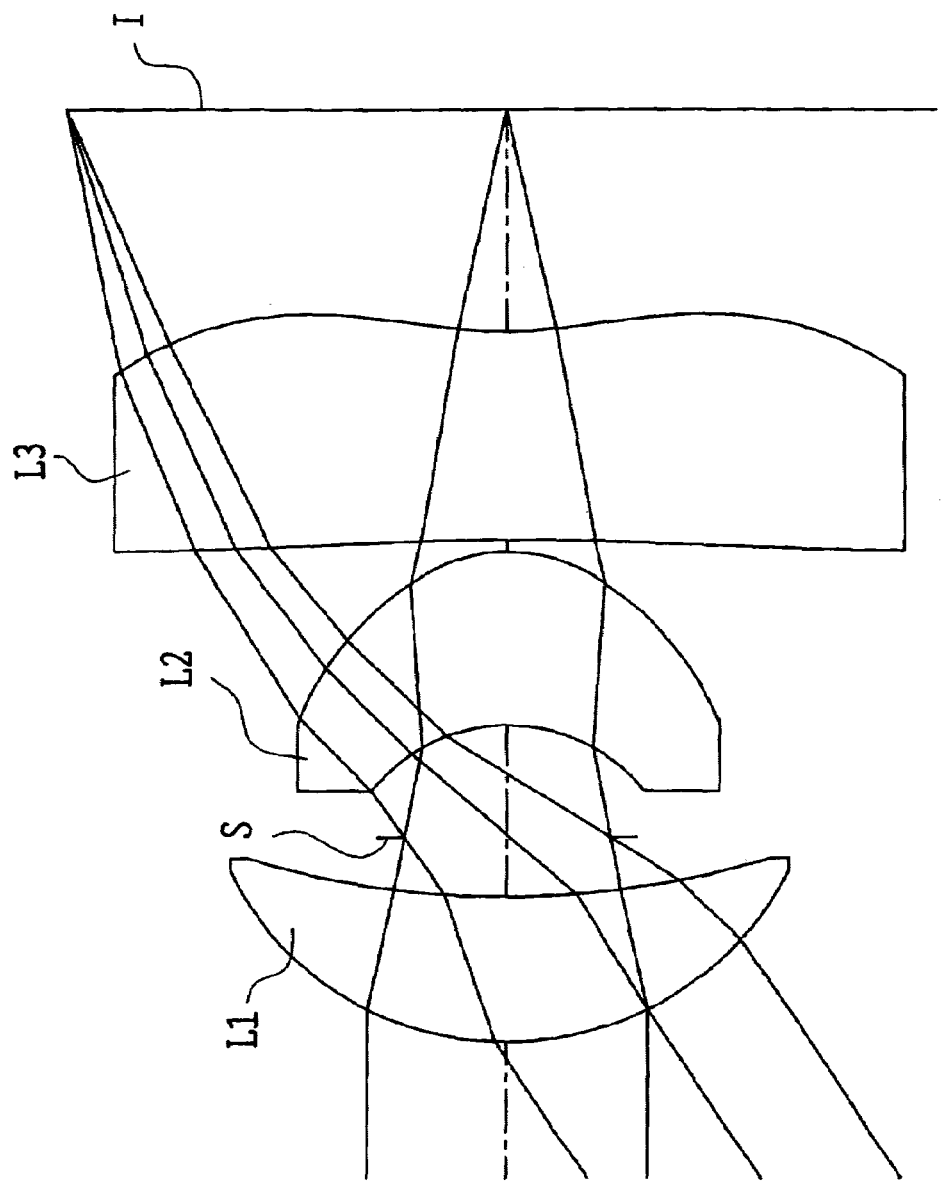

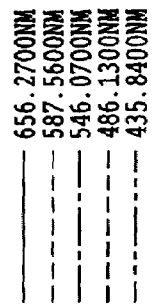
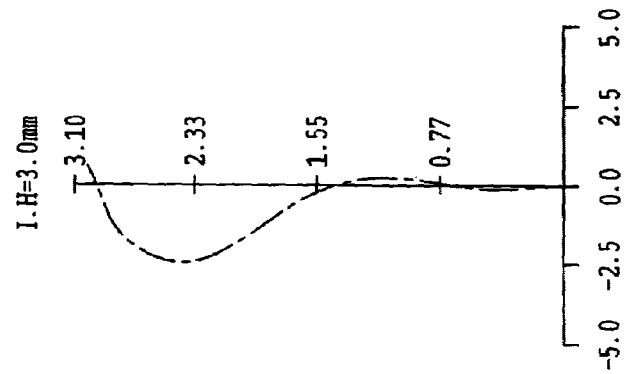
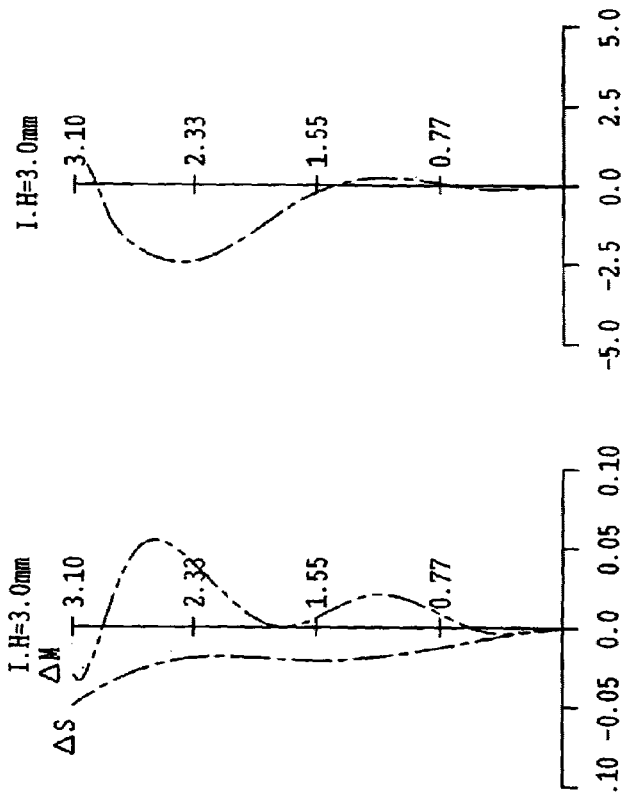
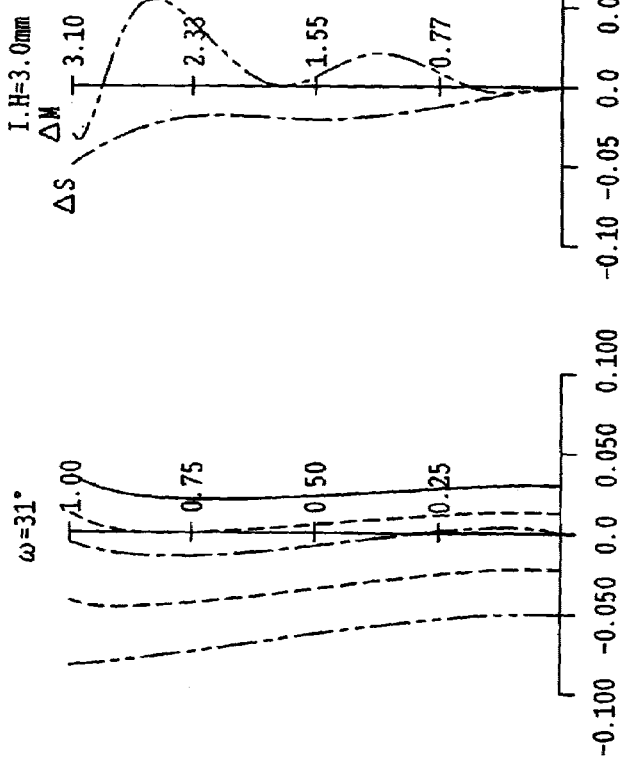

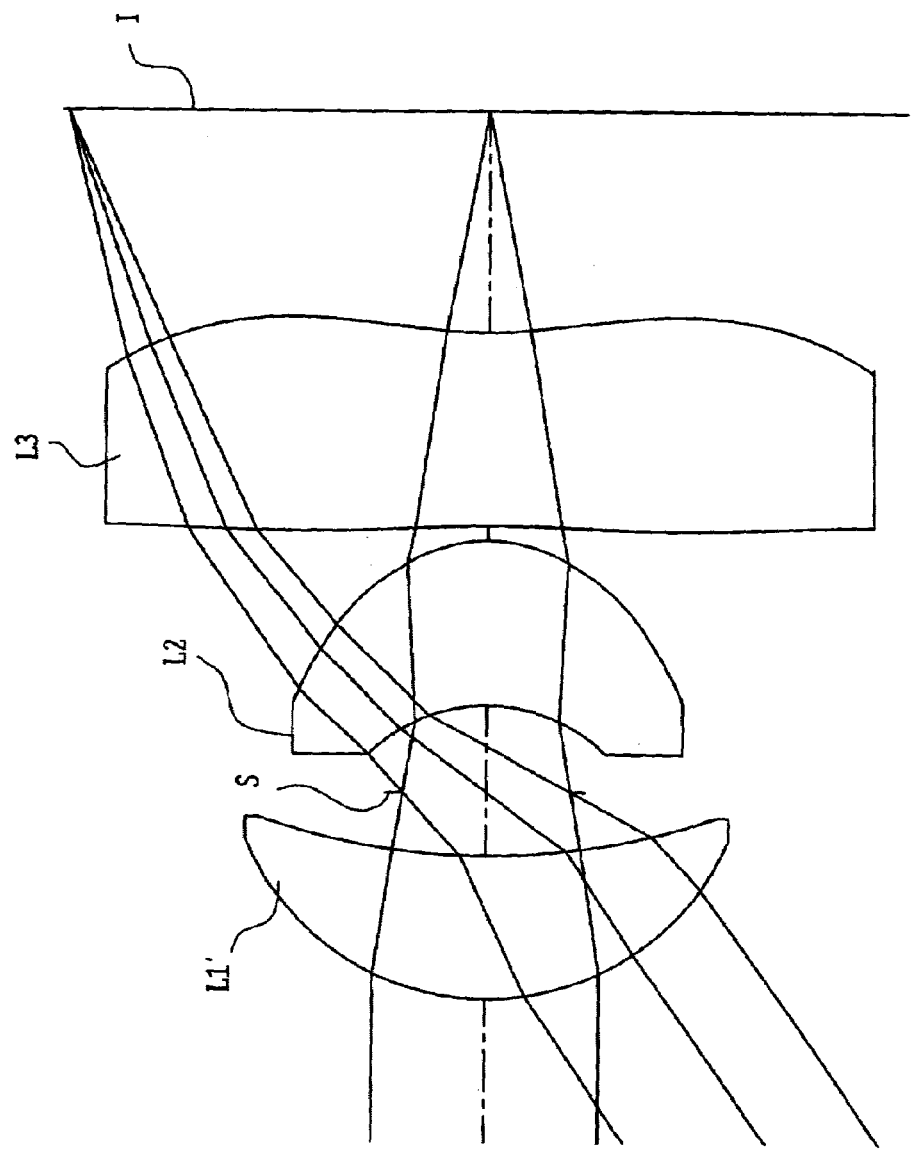

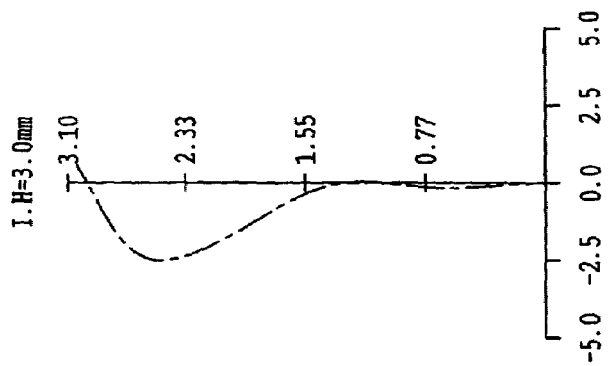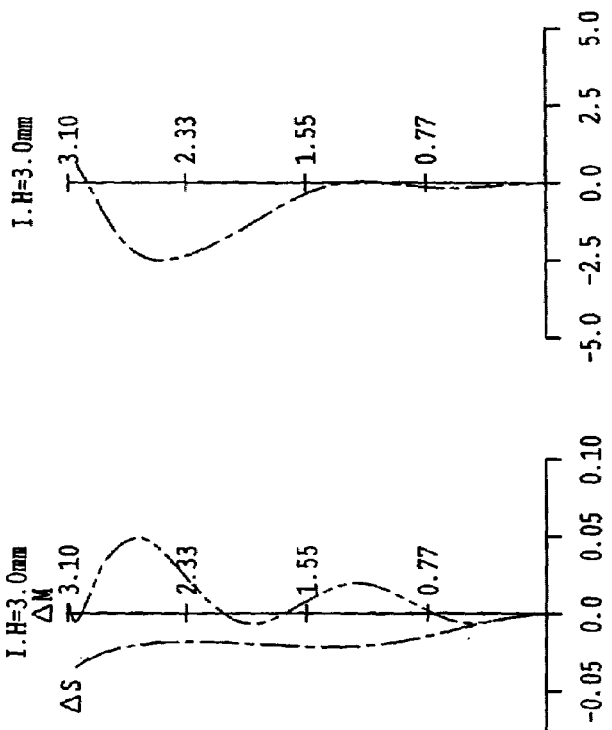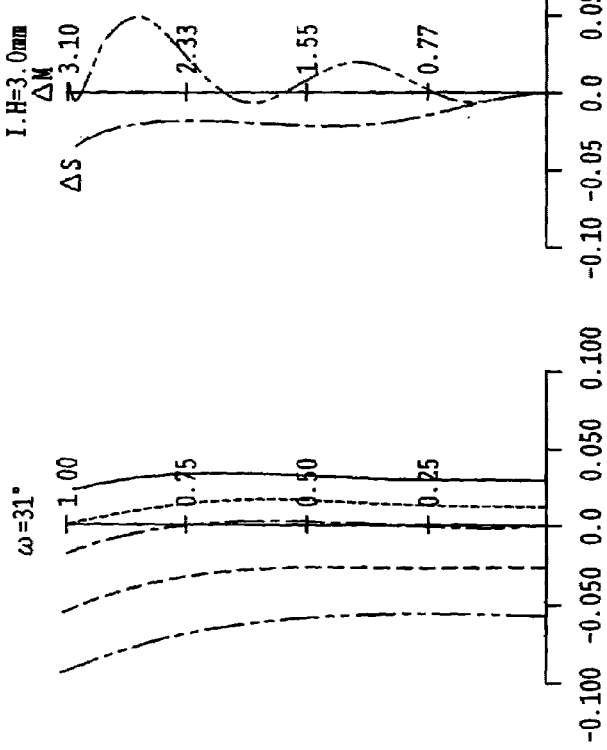

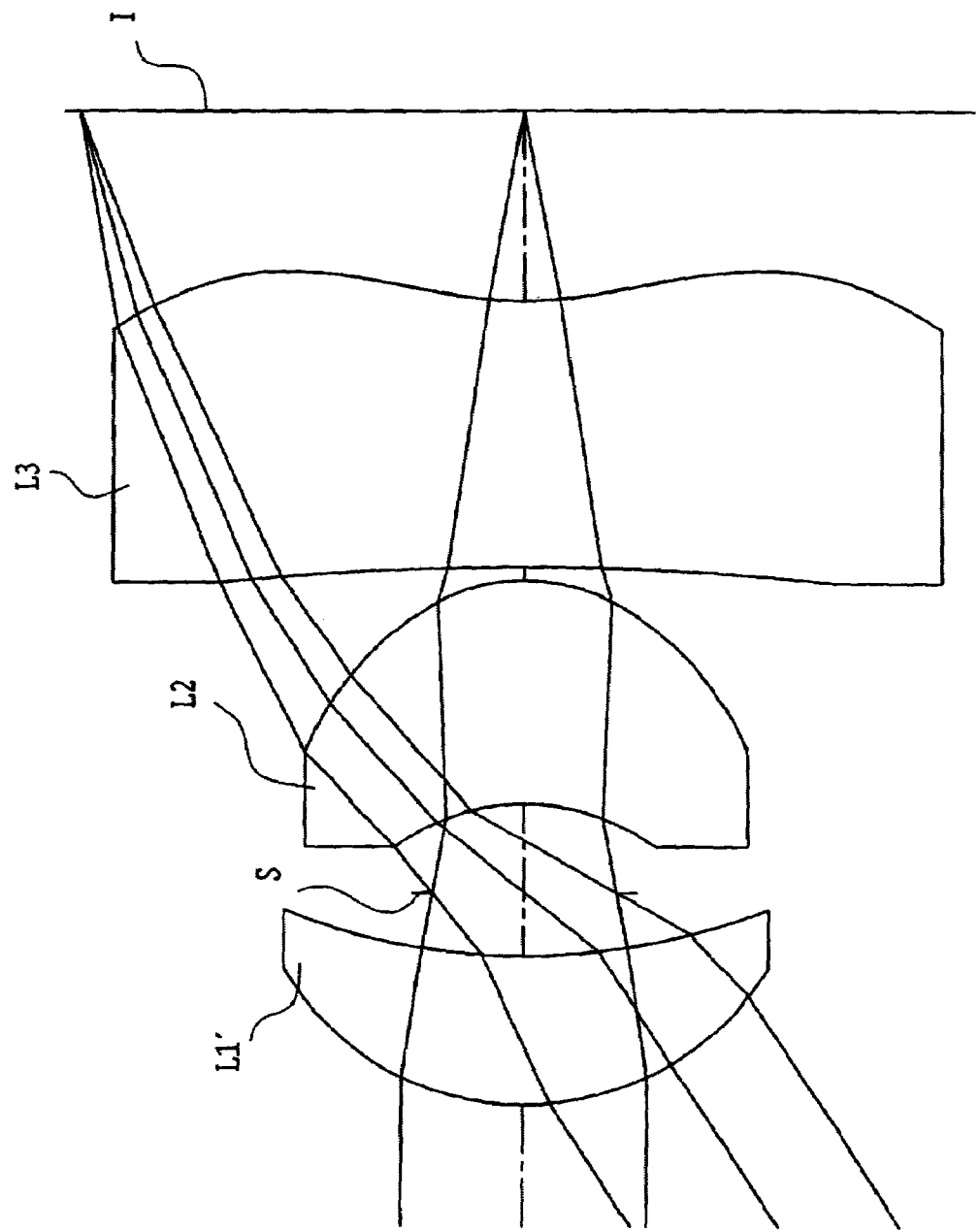

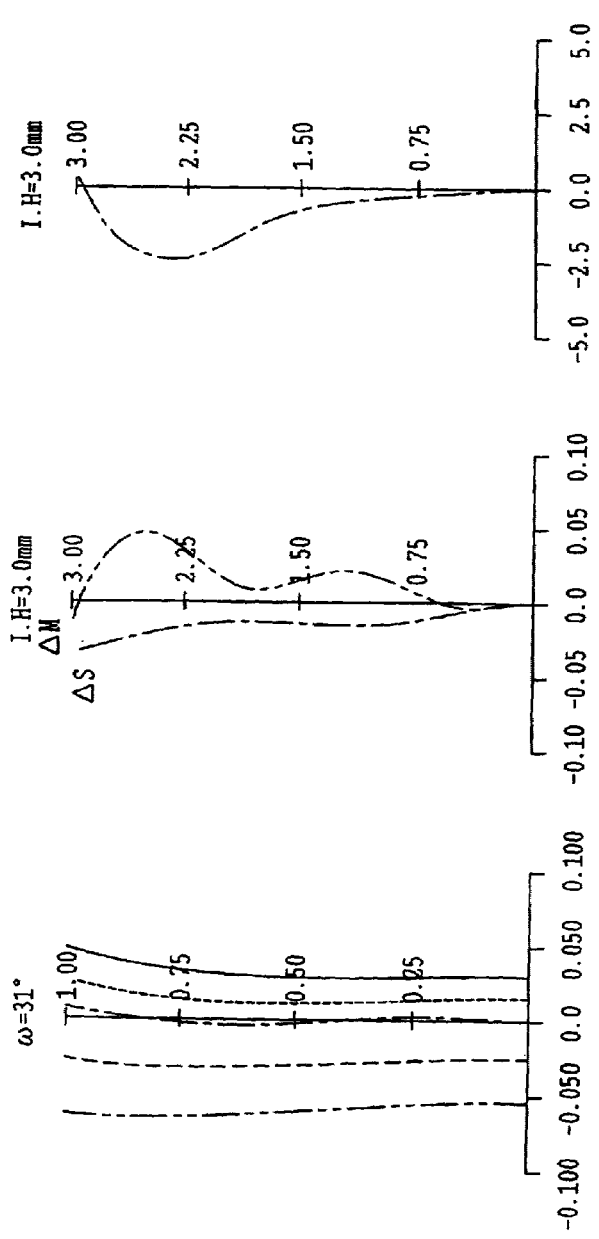

Fig. 9A
Fig. 9B
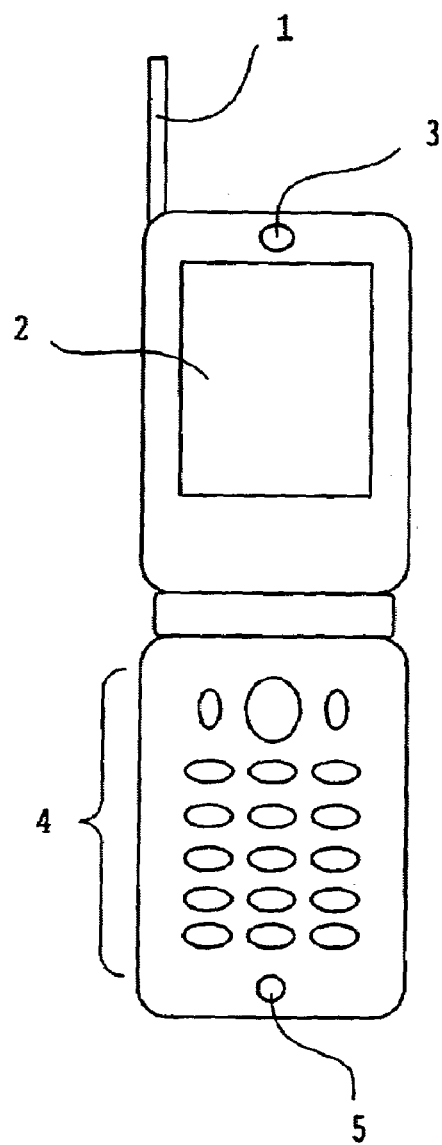
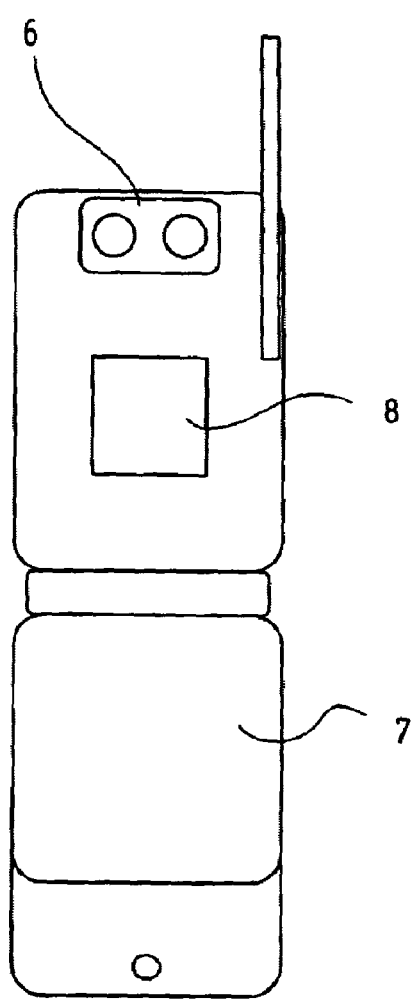

IMAGE FORMING OPTICAL SYSTEM AND ELECTRONIC INSTRUMENT USING THE SAME

BACKGROUND OF THE INVENTION

1. Field of the Invention

The present invention relates to an image forming optical system which can be used for an imaging unit with the solid-state imaging element of CCD, CMOS and the like. For example, it relates to an image forming optical system which can be used for a miniature camera and a monitor camera and the like which are equipped in, for example, a digital still camera, a digital video camera, a cellular phone, PC and the like.

The present invention also relates to an electronic instrument such as a digital still camera, a digital video camera, a cellular phone, PC and the like which use the image forming optical system.

2. Description of the Related Art

In recent years, electronic cameras for taking a photograph by using a solid-state imaging element like CCD and CMOS instead of using silver salt film have become popular.

In such electronic cameras, for an imaging unit which is equipped in a portable type computer or a cellular phone and the like, miniaturization and weight-lightening have been particularly demanded.

As an image forming optical system used for such imaging unit, conventionally there are systems constituted with single lens or two lenses. However, it has been already known that in the image forming optical system having such constitution as mentioned above, curvature of field cannot be corrected and high performance cannot be expected. Therefore, it is necessary to constitute with three or more lenses are required in order to achieve high performance in an image forming optical system.

On the other hand, when an imaging element like CCD is used for an imaging unit, if off-axis luminous flux emanated from an image forming optical system enters with too large incident angle to an image plane, condensing performance of a micro lens is not fully exercised. Accordingly, problem that the brightness of a picture image changes extremely in the central portion and the circumferential portion of the picture image arises.

Therefore, the incident angles of the light to an imaging element as CCD or the like, that is, the position of an exit pupil becomes important in designing. Furthermore, the position of an aperture stop becomes important when an optical system is constituted with small number of lenses.

As systems in which these problems are taken into consideration, there are optical systems where an aperture stop is arranged from an object side before the first lens, or between the first lens and the second lens. As conventional examples, such image forming optical systems have been disclosed in the following documents such as Japanese published unexamined patent applications: Toku Kai Hei 05-188284, Toku Kai Hei 07-27974, Toku Kai Hei 09-288235, Toku Kai Hei 11-52227 and Toku Kai 2001-83409.

SUMMARY OF THE INVENTION

The image forming optical system of the present invention comprises, in order from an object side, a first lens which is meniscus lens having positive refractive power and a convex surface directed toward an object side, an aperture stop, a second lens which is meniscus lens having positive refractive power and a convex surface directed toward the object side, and a third lens having negative refractive power.

The electric device according to the present invention is equipped with the image forming optical system mentioned above.

According to the present invention, an image forming optical system in which degradation of performance to manufacture error is little and high performance is achieved whenever it is miniaturized can be offered.

These and other features and advantages of the present invention will become apparent from the following detailed description of the preferred embodiments when taken in conjunction with the accompanying drawings.

BRIEF DESCRIPTION OF THE DRAWINGS

FIG. 1 is a sectional view showing an optical arrangement developed along the optical axis in the first embodiment of an image forming optical system according to the present invention.

FIGS. 2A, 2B and 2C are graphs showing spherical aberration, astigmatism and distortion of an image forming optical system in the first embodiment respectively.

FIG. 3 is a sectional view showing an optical arrangement, developed along the optical axis in the second embodiment of an image forming optical system according to the present invention.

FIGS. 4A, 4B and 4C are graphs showing spherical aberration, astigmatism and distortion of an image forming optical system in the second embodiment respectively.

FIG. 5 is a sectional view showing an optical arrangement, developed along the optical axis in the third embodiment of an image forming optical system according to the present invention.

FIGS. 6A, 6B and 6C are graphs showing spherical aberration, astigmatism and distortion of an image forming optical system in the third embodiment respectively.

FIG. 7 is a sectional view showing an optical arrangement, developed along the optical axis in the fourth embodiment of an image forming optical system according to the present invention.

FIGS. 8A, 8B and 8C are graphs showing a spherical aberration, an astigmatism and a distortion of an image forming optical system in the fourth embodiment respectively.

FIGS. 9A and 9B are a front view and a rear view showing an outlined construction of a cellular phone using an image forming optical system according to the present invention.

DETAILED DESCRIPTION OF THE PREFERRED EMBODIMENTS

Figure 10A:
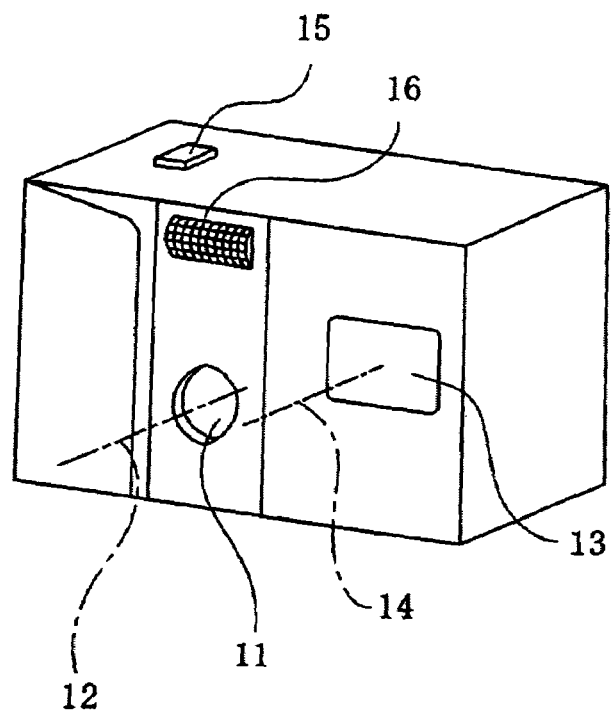
FIGS. 10A and 10B are a front perspective view and a rear perspective view showing an outlined construction of a digital camera using an image forming optical system according to the present invention.

Prior to explaining embodiments, reasons why the constitution of the present invention has been made as well as function and advantages of the present invention will be explained.

First of all, explanation is made with respect to the number of lenses constituting an image forming optical system.

Taking into consideration of performance and miniaturization, in the present invention, an image forming optical system is constituted with three lenses.

If an image forming optical system is constituted using four or more lenses, it is evident that the performance is improved further.

However, when the number of lens increases one by one, the thickness of lenses, the distance between lenses and the space of frame increase accordingly and enlarging of the size is inevitable.

In case that an image forming optical system is constituted with two lenses or one lens as adopted in the conventional technology as mentioned above, the performance of circumference deteriorates considerably as the curvature of the image plane can not become small.

On the other hand, if three lenses are used in an image forming optical system, the performance and the size becomes optimal.

Next, when an imaging element like CCD is used in an unit using an image forming optical system, it is desirable that an aperture stop is arranged at the position distant from the image plane.

By such arrangement, incident angle of the light to the imaging element can be made small for keeping good performance of condensing light.

On the other hand, in an optical system having wide angle of view, it is desirable that the aperture stop is arranged symmetrically to power arrangement of the optical system.

Thereby, generation of distortion of circumferential portion of the picture plane and magnification chromatic aberration can be reduced.

From two reasons mentioned above, in the image forming optical system the position of the aperture stop is set between the first lens and the second lens.

By this arrangement, an optical system in which telecentric function is much noted has been realized.

This enable to realize most effectively that incident angle of the light to the image element is small as well as generation of the distortion of circumferential portion of the picture plane and magnification chromatic aberration are reduced.

Moreover, in the image forming optical system, if the first lens is constituted with a meniscus lens having positive power and a surface with strong curvature toward an object side, the principal point position of the first lens having positive power can be moved to the object side, and it become advantageous for shortening the whole length.

In addition, in the image forming optical system, the first lens and the second lens are a meniscus lens having positive power and a convex surface directed toward the object side and a meniscus lens having positive power and a convex surface directed toward the image side respectively, and an aperture stop is placed between the first lens and the second lens.

By this way, the power arrangement in the optical viewpoint becomes, in order from the object side, (positive, negative) and (negative, positive).

As a result, deflection angle, that is, an angle which is formed by an incident light and an exit light, can be kept small, and generation of aberration can be suppressed.

As the generation of aberration in case of non-decentering is small by nature, it is the constitution which is hard to be influenced by the performance fluctuation in case of relative decentering of a lens.

As mentioned above, in the image forming optical system the first lens has positive power and the second lens has negative power as a power arrangement in order to shorten the whole length of an optical system.

However, in a wide angle optical system, if a lens which is at the utmost image side has negative power from the center portion to the circumferential portion the following inconvenience occurs.

For example, it is supposed that CCD, as an imaging element, which limits incident angle is used in order to avoid a shading.

In this case, if the power is negative from the center portion to the circumferential portion, the incident angle of the light cannot be made small at the position where the height of the light is large.

Then, at least one of surfaces of the lens which is at the utmost of an image plane side is made aspherical and the power of the circumferential portion of the lens is made positive, even if the power of the center portion of the lens is negative.

In this constitution, by refracting the light, at the position where the height of the light is high, widely toward the optical axis side, the incident angle of the light to the image plane can be small.

Therefore, in the image forming optical system, it is important that the following condition (1) is satisfied in the third lens which is at the utmost image side.

$$-2.0 < \Phi m/\Phi p < 0 \quad (1)$$

where $\Phi m$ is the power of the third lens at position with the maximum height of the light and $\Phi p$ is the power of the third lens on the paraxis.

Here, the power $\Phi m$ of the lens in the position with maximum height of the light is defined as follows. It is given by $\Phi m\text{-}\tan\xi/Hm$, when a parallel light is entered to the maximum height Hm of the light of the lens that is an object from the infinite point of the object side, and an inclined angle after passing through the lens is represented by $\xi$.

When $\Phi m/\Phi p$ falls below the minimum limit of this condition (1), the power of the paraxis becomes weak too much and the whole length has become long, otherwise, the positive power of circumference becomes strong too much. Thus, the performance of circumference is remarkably degraded. On the other hand, when it exceeds the upper limit, the positive power of circumference of the lens becomes weak too much and the correction of the incident angle of the light to the image plane becomes insufficient.

It is better to satisfy the following condition (1').

$$-1.0 < \Phi m/\Phi p < 0 \quad (1')$$

Further, it is much better to satisfy the following condition (1").

$$-0.5 < \Phi m/\Phi p < 0 \quad (1")$$

Furthermore, in the image forming optical system it is better that the following condition (2) is satisfied with respect to the radius of curvature of the surface at the image side of the first lens and the radius of curvature of the surface at the object side of the second lens.

$$0 < (r1r+r2f)/(r1r-r2f) < 1.0 \quad (2)$$

where r1r is the radius of curvature of the surface at the image side of the first lens and r2f is the radius of curvature of the surface at the object side of the second lens.

If condition (2) is satisfied, the deflection angle of the first lens and the second lens can be made small, and it becomes possible to suppress the performance degradation by the relative decentering of lenses.

When $(r1r+r2f)/(r1r-r2f)$ exceeds the upper limit of the condition (2), the negative power at the object side of the second lens becomes small too much and an aberration generated in the first lens cannot be well corrected. On the other hand, when it falls below the minimum limit of the condition (2), the negative power at the object side of the second lens becomes strong too much. As a result, it becomes difficult to correct spherical aberration and comatic aberration generated in this surface by using other surfaces. Preferably it is desirable that in the image forming optical system the following condition (2') is satisfied.

$$0.2<(r1r+r2f)/(r1r-r2f)<0.9 \quad (2')$$

Furthermore, it is desirable that in the image forming optical system the following condition (2") is satisfied.

$$0.5<(r1r+r2f)/(r1r-r2f)<0.7 \quad (2'')$$

In an image forming optical system, in order to shorten the whole length of an image forming optical system it is necessary to arrange the principal point position of the image forming optical system near to the object side. Accordingly the power of the first lens is important.

Therefore, in the image forming optical system, it is desirable to satisfy the following condition (3).

$$0.1<r1f/f<1.0 \quad (3)$$

where r1f is the radius of curvature of the surface at the object side of the first lens, and f is the whole focal length of the image forming optical system.

When r1f/f exceeds the upper limit of the condition (3), the radius of curvature of the first surface becomes large and the principal point position of the first lens having positive power becomes at the image side.

In order to shorten the whole length of the image forming optical system, the power of each lens must be strengthen. However, if the power is strong an aberration is easily generated. Accordingly it becomes difficult to obtain a predetermined performance.

On the other hand, when it falls below the minimum limit of the condition (3), it is advantageous to shorten the whole length of an image forming optical system, but correction of the spherical aberration generated by the first surface becomes difficult.

In the image forming optical system, it is preferable to satisfy the following condition (3').

$$0.2<r1f/f<0.8 \quad (3')$$

Furthermore, in the image forming optical system it is preferable to satisfy the following condition (3").

$$0.3<r1f/f<0.6 \quad (3'')$$

The following constitution is adopted in the image forming optical system in order to shorten the whole length.

That is, it is a telephoto type optical system by the positive power in the first lens and the second lens, and the negative power in the third lens.

Therefore, in the arrangement of this telephoto type having positive power and negative power, in order to attain shortening of the whole length as well as securing of performance with good balance in the image forming optical system, it is desirable to satisfy the following conditions (4) and (5).

$$0.2<f12/|f3|<1.5 \quad (4)$$

$$0.5<f/|f3|<2.0 \quad (5)$$

where f12 is total focal length of the first lens and the second lens, f3 is focal length of the third lens and f is the whole focal length of the image forming optical system as a whole system.

If the conditions (4) and (5) are not satisfied, the balance of the positive power and negative power which constitute the telephoto type is collapsed and the whole length of the image forming optical system increases or the performance is degraded. That is, when exceeding the upper limit of the conditions (4) and (5), the negative power which constitutes the telephoto type becomes weak and therefore it becomes disadvantageous for shortening of the whole length of the image forming optical system. On the other hand, when falling below the minimum limit of the conditions (4) and (5), the negative power which constitutes the telephoto type becomes strong too much. Accordingly, the positive power must also be strengthened and the aberration generated in each lens increases, and securing of the performance becomes difficult.

In the image forming optical system, it is preferable to satisfy the following conditions (4') and (5').

$$0.4<f12/|f3|<1.3 \quad (4')$$

$$0.7<f/|f3|<1.5 \quad (5')$$

Furthermore, it is preferable to satisfy the following conditions (4") and (5").

$$0.6<f12/|f3|<0.9 \quad (4'')$$

$$0.9<f/|f3|<1.2 \quad (5'')$$

In the image forming optical system, the first lens, the second lens and the third lens are arranged where an aperture stop is arranged between the first lens and the second lens. Here, in order to make magnification chromatic aberration and distortion small, it is important to constitute so that an off-axis light flux may pass in point symmetry to the center position of the aperture stop.

Therefore, in the image forming optical system it is desirable to satisfy the following condition (6).

$$5.0<f1/f23<1.3 \quad (6)$$

where f1 is the focal length of the first lens and f23 is the total focal length of the second lens and the third lens.

When f1/f23 exceeds the upper limit of the condition (6) or falling below the minimum limit of the condition (6), magnification chromatic aberration and distortion are excessively corrected or insufficiently corrected. Consequently, in both cases, the performance of circumference becomes worse.

In the image forming optical system it is preferable to satisfy the following condition (6').

$$0<f1/f23<1.0 \quad (6')$$

Furthermore, in the image forming optical system is desirable to satisfy the following condition (6").

$$0.4<f1/f23<7.0 \quad (6'')$$

Moreover, in the image forming optical system, in order to correct an axial chromatic aberration it is desirable that achromatism is performed by the whole lenses and the following condition (7) is satisfied.

$$0.5<(v1-v3)/(v2-v3)<1.5 \quad (7)$$

where v1 represent the Abbe's number of the first lens, v2 is the Abbe's number of the second lens and v3 is the Abbe's number of the third lens.

When exceeding the upper limit of the condition (7) or falling below the minimum limit of the condition (7), an axial chromatic aberration is excessively corrected or insufficiently corrected. Consequently, securing of the performance of center portion becomes difficult.

In the image forming optical system, it is preferable to satisfy the following condition (7').

$$0.7<(v1-v3)/(v2-v3)<1.3 \quad (7')$$

Furthermore, in the image forming optical system it is desirable to satisfy the following condition (7").

$$0.8<(v1-v3)/(v2-v3)<1.2 \quad (7")$$

Meanwhile, in case that CCD is used for an imaging element, the phenomenon so-called shading occurs. This is the phenomenon in which the brightness of the picture image differs at the center portion of the picture image and at the circumferential portion of the picture image when an off-axis light flux emanated from an optical system enters into an image plane.

On the other hand, if an incident angle to the image plane is small, the shading problem is reduced. But in this case, the total length of imaging optical system becomes long.

Therefore, in the image forming optical system, it is desirable to satisfy the following condition (8).

$$0.4<EXP/f<1.5 \quad (8)$$

Where EXP is the distance to the exit pupil from the image plane, and f is the whole focal length of the image forming optical system as a whole system.

When EXP/f exceeds the upper limit of the condition (8) the whole length of the image forming optical system becomes large.

On the other hand, when EXP/f falls below the minimum limit of the condition (8), the angle of incidence to CCD becomes big too much, and the brightness of circumferential portion of the picture image decreases.

In the image forming optical system it is preferable to satisfy the following condition (8').

$$0.6<EXP/f<1.3 \quad (8')$$

Furthermore, in the image forming optical system it is desirable to satisfy the following condition (8").

$$0.8<EXP/f<1.1 \quad (8")$$

Moreover, in the image forming optical system, it is desirable to satisfy the following condition (9).

$$0.55[1/\mu m]<Fno/P[\mu m]<2.10[1/\mu m] \quad (9)$$

Where Fno is F number of the optical system and P is pixel pitch of an imaging element.

When Fno/P exceeds the upper limit of the condition (9) light quantity per one picture element becomes small since the optical system becomes too dark or the pixel pitch of the picture element becomes too small. Accordingly, the shutter speed becomes slow, and this may cause hand blur and increase of noise by a long time exposure. On the other hand, when Fno/P falls below the minimum limit of the condition (9), the pixel pitch of the picture element becomes too large and accordingly imaging data with fine pixel pitch cannot be obtained.

In the image forming optical system it is preferable to satisfy the following condition (9').

$$0.65[1/\mu m]<Fno/P[\mu m]<1.50[1/\mu m] \quad (9')$$

Furthermore, in the image forming optical system is preferable to satisfy the following condition (9')

$$0.77[1/\mu m]<Fno/P[\mu m]<1.18[1/\mu m] \quad (9")$$

Moreover, in the image forming optical system, it is desirable to satisfy the following condition (10).

$$0.05<ML/TL<0.35 \quad (10)$$

where ML represents the minimum thickness of a plastic lens on the axis and TL is the whole length of the optical system.

When ML/TL exceeds the upper limit of the condition (10) the workability of a glass lens is aggravated, since the thickness of center of the glass lens cannot be sufficiently secured because the minimum thickness of a plastic le ns on the axis is too big to the whole length of the optical system. On the other hand, when ML/TL falls below the minimum limit, the productivity is aggravated since plastic resin cannot be entered smoothly into a formation die because the minimum thickness of a plastic lens on the axis is too small and accordingly it causes generating stress and double refraction as well as more time consuming for molding.

In the image forming optical system it is preferable to satisfy the following condition (10').

$$0.10<ML/TL<0.27 \quad (10')$$

Furthermore, in the image forming optical system is desirable to satisfy the following condition (10").

$$0.14<ML/TL<0.20 \quad (10")$$

Hereafter, embodiments of the present invention will be explained using drawings.

The First Embodiment

FIG. 1 is a sectional view showing an optical arrangement developed along the optical axis of an image forming optical system in the first embodiment. FIGS. 2A, 2B and 2C are graphs showing spherical aberration, astigmatism and distortion of an image forming optical system in the first embodiment respectively.

An image forming optical system of the first embodiment comprises, in order from an object side, a first lens L1 which is meniscus lens having positive refractive power and a convex aspherical surface directed toward an object side, an aperture stop S, a second lens L2 which is meniscus lens having positive refractive power, double aspherical surfaces and a convex surface directed toward the image side, and a third lens L3 having negative refractive power, double aspherical surfaces where the power of the center portion is negative and the power of the circumferential portion is positive.

In FIG. 1, reference symbol I represents an imaging plane of an imaging element. On the image plane of the optical system, an imaging element having 1,300,000 pixels (a pitch of picture element 3.6 $\mu$m) in ⅓ inches square is arranged.

Lens data of optical members constituting the image forming optical system of the first embodiment are listed below.

In the first embodiment the first lens L1 and the second lens L2 are made of glass and the third lens L3 is made of plastic (polycarbonate). In the lens data of the first embodiment, refractive indices and Abbe's numbers are values at e-lines.

When z is taken as the coordinate in the direction of the optical axis, y is taken as the coordinate normal to the optical axis, K represents a conic constant, and a, b, represent aspherical coefficients, the configuration of each of the aspherical surface is expressed by the following equation:

$$Z=(y^2/r)/[+\{1-(1+K)(y/r)^2\}^{1/2}]+ay^4+by^6+\ldots$$

These symbols are commonly used in embodiments to be described later.

Numerical Data 1
focal length f=4.6 mm, Fno.=2.8, image height HT=3.0 mm, half field angle ω=31°.

| Surface No. | Radius Curvature | Surface (air space) Distance | Refraction Index | Abbe's No. |
|---|---|---|---|---|
| Object surface | ∞ | ∞ | | |
| 1 | aspherical surface [1] | 1.12 | 1.5163 | 64.1 |
| 2 | 8.55 | 0.44 | | |
| 3 | aperture stop | 0.77 | | |
| 4 | aspherical surface [2] | 1.55 | 1.5891 | 61.2 |
| 5 | aspherical surface [3] | 0.22 | | |
| 6 | aspherical surface [4] | 1.26 | 1.5839 | 30.2 |
| 7 | aspherical surface [5] | 1.66 | | |
| Image plane | ∞ | | | | aspherical surface [1]
radius of curvature 2.32
k=2.1257×10$^{-2}$
a=2.4932×10$^{-3}$ b=7.0861×10$^{-4}$
aspherical surface [2]
radius of curvature −1.80
k=1.3698×10$^{+0}$
a=−7.3856×10$^{-2}$
aspherical surface [3]
radius of curvature −1.14
k=−8.3219×10$^{-1}$
a=2.7759×10$^2$ b=−1.4018×10$^2$
aspherical surface [4]
radius of curvature −23.77
k=7.6623×10$^{+1}$
a=4.3204×10$^{-3}$
aspherical surface [5]
radius of curvature 2.70
k=−1.3298×10$^{+1}$
a=−1.5317×10$^{-2}$ b=6.0974×10$^{-4}$ The Second Embodiment FIG. 3 is a sectional view showing an optical arrangement, developed along the optical axis of an image forming optical system in the second embodiment. FIGS. 4A, 4B and 4C show spherical aberration, astigmatism and distortion of an image forming optical system in the second embodiment respectively.

An image forming optical system in the second embodiment comprises, in order from an object side, a first lens L1 which is meniscus lens having positive refractive power, an aspherical convex surface directed toward an object side, an aperture stop, a second lens L2 which is meniscus lens having positive refractive power, double aspherical surfaces and a convex surface directed toward the image side, and a third lens L3 having negative refractive power, double aspherical surfaces where the power of the center portion is negative and the power of the circumferential portion is positive.

In FIG. 3, reference symbol I represents an imaging plane of an imaging element.

Lens data of optical members constituting the image forming optical system of the second embodiment are listed below.

In the second embodiment, the first lens L1 is made of glass and the second lens L2 and the third lens L3 are made of plastic. In detail, the second lens L2 is made of Zeonex and the third lens L3 is made of polycarbonate.

On the image plane of the optical system an imaging element having 2,000,000 pixels (a pitch of picture element 3.0 μm) in ⅓ inches square is arranged.

Numerical Data 2
focal length f=4.6 mm, Fno.=2.4, image height HT=3.0 mm, half field angle ω=31°.

| Surface No. | Radius Curvature | Surface (air space) Distance | Refraction Index | Abbe's No. |
|---|---|---|---|---|
| Object surface | ∞ | ∞ | | |
| 1 | aspherical surface [1] | 1.04 | 1.5831 | 59.4 |
| 2 | 8.55 | 0.44 | | |
| 3 | aperture stop | 0.76 | | |
| 4 | aspherical surface [2] | 1.23 | 1.5256 | 56.4 |
| 5 | aspherical surface [3] | 0.10 | | |
| 6 | aspherical surface [4] | 1.46 | 1.5839 | 30.2 |
| 7 | aspherical surface [5] | 1.56 | | |
| Image plane | ∞ | | | | aspherical surface [1]
radius of curvature 2.19
k=1.0272×10$^{-1}$
a=1.9376×10$^{-3}$ b=7.2822×10$^{-4}$
aspherical surface [2]
radius of curvature −1.50
k=1.0172×10$^{-1}$
a=−8.5104×10$^{-2}$
aspherical surface [3]
radius of curvature −1.02
k=−7.7974×10$^{-1}$
a=3.1554×10$^{+2}$ b=−2.0397×10$^{-2}$
aspherical surface [4]
radius of curvature −25.93
k=−1.1898×10$^{+2}$
a=2.7400×10$^{-3}$
aspherical surface [5]
radius of curvature 2.95
k=−1.5198×10$^{+1}$
a=−2.3321×10$^{-2}$ b=9.9319×10$^{-4}$ The Third Embodiment FIG. 5 is a sectional view showing an optical arrangement, developed along the optical axis, of an image forming optical system in the third embodiment. FIGS. 6A, 6B and 6C show spherical aberration, astigmatism and distortion of an image forming optical system in the third embodiment respectively.

An image forming optical system in the third embodiment comprises, in order from an object side, a first lens L1' which is meniscus lens having positive refractive power, double aspherical surfaces and a convex surface directed toward an object side, an aperture stop, a second lens L2 which is meniscus lens having positive refractive power, double aspherical surfaces and a convex surface directed toward the image side, and a third lens L3 having negative refractive power, double aspherical surfaces where the power of the center portion is negative and the power of the circumferential portion is positive. In FIG. 5, reference symbol I represents an imaging plane of an imaging element.

Lens data of optical members constituting the image forming optical system of the third embodiment are listed below.

In the third embodiment, all lenses are made of plastic.

In detail, the first lens and the second lens are made of Zeonex and the third lens is made of polycarbonate.

On the image plane of the optical system, an imaging element having 3,000,000 pixels (a pitch of picture element 2.4 μm) in ⅓ inches square is arranged.

Numerical Data 3 focal length f=4.5 mm, Fno.=2.8, image height HT=3.0 mm, half field angle ω=34°.

| Surface No. | Radius Curvature | Surface (air space) Distance | Refraction Index | Abbe's No. |
|---|---|---|---|---|
| Object surface | ∞ | ∞ | | |
| 1 | aspherical surface [1] | 1.06 | 1.5256 | 56.4 |
| 2 | aspherical surface [2] | 0.46 | | |
| 3 | aperture stop | 0.66 | | |
| 4 | aspherical surface [3] | 1.22 | 1.5256 | 56.4 |
| 5 | aspherical surface [4] | 0.10 | | |
| 6 | aspherical surface [5] | 1.45 | 1.5839 | 30.2 |
| 7 | aspherical surface [6] | 0.14 | | |
| 8 | ∞ | 1.51 | | |
| Image plane | ∞ | | | | aspherical surface [1]
radius of curvature 2.04
$k=3.5240 \times 10^{-1}$
$a=3.8084 \times 10^{-4}$ $b=5.3270 \times 10^{-4}$
aspherical surface [2]
radius of curvature 5.60
$k=2.9258 \times 10^{+0}$
$a=5.6408 \times 10^{-3}$
aspherical surface [3]
radius of curvature −1.36
$k=8.2622 \times 10^{-1}$
$a=-9.7733 \times 10^{-2}$ $b=1.4302 \times 10^{-2}$
aspherical surface [4]
radius of curvature −0.97
$k=-7.2104 \times 10^{-1}$
$a=3.7885 \times 10^{-2}$ $b=-2.0112 \times 10^{-2}$
aspherical surface [5]
radius of curvature −58.12
$k=5.7689 \times 10^{+2}$
$a=3.4088 \times 10^{-3}$
aspherical surface [6]
radius of curvature 2.94
$k=-1.6741 \times 10^{-1}$
$a=-2.4078 \times 10^{-2}$ $b=1.3122 \times 10^{-3}$ The Fourth Embodiment FIG. 7 is a sectional view showing an optical arrangement, developed along the optical axis of an image forming optical system in the fourth embodiment. FIGS. 8A, 8B and 8C show spherical aberration, astigmatism and distortion of an image forming optical system in the fourth embodiment respectively.

An image forming optical system in the fourth embodiment comprises, in order from an object side, a first lens L1' which is meniscus lens having positive refractive power, double aspherical surfaces and a convex surface directed toward an object side, an aperture stop, a second lens L2 which is meniscus lens having positive refractive power, double aspherical surfaces and a convex surface directed toward the image side, and a third lens L3 having negative refractive power, double aspherical surfaces where the power of the center portion is negative and the power of the circumferential portion is positive.

In FIG. 7, reference symbol I represents an imaging plane of an imaging element.

Lens data of optical members constituting the image forming optical system of the third embodiment are listed below.

In the fourth embodiment, all lenses are made of plastic.

In detail, the first lens and the second lens are made of Zeonex and the third lens is made of polycarbonate.

On the image plane of the optical system, an imaging element having 2,000,000 pixels (a pitch of picture element 3.0 μm) in ⅓ inches square is arranged.

Numerical Data 4 focal length f=4.65 mm, Fno.=2.8, image height HT=3.0 mm, half field angle ω=33°.

| Surface No. | Radius Curvature | Surface (air space) Distance | Refraction Index | Abbe's No. |
|---|---|---|---|---|
| Object surface | ∞ | ∞ | | |
| 1 | aspherical surface [1] | 1.05 | 1.5256 | 56.4 |
| 2 | aspherical surface [2] | 0.45 | | |
| 3 | aperture stop | 0.64 | | |
| 4 | aspherical surface [3] | 1.56 | 1.5256 | 56.4 |
| 5 | aspherical surface [4] | 0.10 | | |
| 6 | aspherical surface [5] | 1.88 | 1.5839 | 30.2 |
| 7 | aspherical surface [6] | 1.33 | | |
| 8 | ∞ | 1.51 | | |
| Image plane | ∞ | | | | aspherical surface [1]
Radius of curvature 2.05
$k=4.6507 \times 10^{-1}$
$a=3.7625 \times 10^{-4}$ $b=8.1987 \times 10^{-4}$
aspherical surface [2]
radius of curvature 5.69
$k=3.5391 \times 10^{+0}$
$a=1.1185 \times 10^{-2}$ aspherical surface [3]
radius of curvature −1.68
k=1.4236×10$^{+0}$
a=−4.7874×10$^{-2}$ b=−3.4864×10$^{-2}$
aspherical surface [4]
radius of curvature −1.12
k=−6.0437×10$^{-1}$
a=4.2650×10$^{-2}$ b=−1.0446×10$^{-2}$
aspherical surface [5]
radius of curvature −34.06
k=2.2622×10$^{+2}$
a=−1.1040×10$^{-3}$
aspherical surface [6]
radius of curvature 2.68
k=−1.1850×10$^{+1}$
a=−1.6923×10$^{-2}$ b=3.9551×10$^{-4}$ In the embodiments mentioned above, all of lenses in the image forming optical system are made of plastic. However, all of the lenses can be constituted with glass. For example, if the lenses are constituted with glass having refractive index higher than those used in the embodiments, it goes without saying that higher performance can be achieved.

If special low dispersion glass is used for lenses used in the image forming optical systems of the embodiments mentioned above, it is effective for correction of the chromatism. In particular, it is desirable to constitute a lens by plastic, because degradation of the performance due to environment change can be reduced by using low hygroscopic material (for example, Zeonex etc., product of Nippon Zeon Co.).

In each embodiment mentioned above, a flare cut stop may be used instead of an aperture stop in order to cut an unnecessary light of ghost, flare and the like. This flare cut aperture may be arranged in any place which is either in front of the first lens, between the first lens and the aperture stop, between the aperture stop and the second lens, between the second lens and the third lens, or between the third lens and the image surface side in the embodiment.

The flare cut stop may be constituted so as to cut flare light by a frame, and it may be constituted with another member. Also, it is possible to constitute a flare cut aperture by printing, painting and gluing a seal and the like, directly to the image forming optical system. As to the shape of the stop, any type of shape formed by such as a circle, an ellipse, a rectangle, a polygon and a scope surrounded by a function curve can be also used. By arranging a flare stop, it is possible to cut not only detrimental luminous flux but also luminous flux of the coma flare and the like around the picture plane.

Moreover, in order to reduce ghost and flare, coating for preventing of reflection can be made to each lens. In such case, it is desirable to carry out multiple coating since the ghost and the flare can be efficiently reduced. Furthermore, infrared cut coating can be also made to surfaces of a lens and a cover glass and the like.

Furthermore, in the image forming optical system of each embodiment mentioned above, focusing can be carried out for adjusting the focus. In such case, the whole lens system can be moved outward for focusing, or a part of lenses can be moved outward or inward for focusing.

In the image forming optical system of each embodiment mentioned above, decrease of the brightness around circumferential portion of a picture image plane can be reduced by shifting a micro lens of CCD.

For example, the design of the micro lens of CCD may be changed according to the incident angle of the light at each image height. Correction of decreased quantity of the brightness around circumferential portion of a picture image plane can be carried out by image processing.

Although illustration is not shown, the image forming optical system is suitable for an optical apparatus such as camera, cellular phone, portable type information entry terminal and the like using film and CCD as a recording part. Therefore, an optical apparatus having the optical system mentioned above is also included as the present invention.

Next, numerical values calculated by parameters in conditions mentioned above concerning each embodiment are shown in the following table 1.

TABLE 1

|  | first embodiment | second embodiment | third embodiment | fourth embodiment |
|---|---|---|---|---|
| Φm/Φp | −0.15 | −0.28 | −0.38 | −0.04 |
| (r1r + r2f)/(r1r − r2f) | 0.65 | 0.59 | 0.61 | 0.54 |
| r1f/f | 0.50 | 0.48 | 0.45 | 0.44 |
| f12/\|f3\| | 0.80 | 0.76 | 0.70 | 0.84 |
| f/\|f3\| | 1.14 | 1.04 | 0.95 | 1.12 |
| f1/f23 | 0.66 | 0.48 | 0.61 | 0.44 |
| (ν1 − ν3)/(ν2 − ν3) | 1.09 | 1.11 | 1.00 | 1.00 |
| EXP/f | 1.00 | 0.91 | 0.94 | 0.86 |
| Fno/P | 0.78 | 0.80 | 1.17 | 0.93 |
| ML/TL | 0.18 | 0.19 | 0.16 | 0.15 |

FIG. 9 shows outlined construction of an embodiment of an electronic instrument concerning the present invention. Here, FIG. 9A is a front view showing appearance of the cellular phone and FIG. 9B is a rear view showing the same. In FIG. 9, reference numeral 1 represents an antenna for transmitting and receiving an electric wave, reference numeral 2 represents a display portion such as LCD, reference numeral 3 is a speaker portion from which a user catches sound, reference numeral 4 is an operation portion, reference numeral 5 is a microphone portion, reference numeral 6 is an image forming optical system portion including an image forming optical system of the present invention, which is arranged at the opposite side to the said portions and reference numeral 7 is a battery and reference numeral 8 is a back side monitor.

Figure 10B:
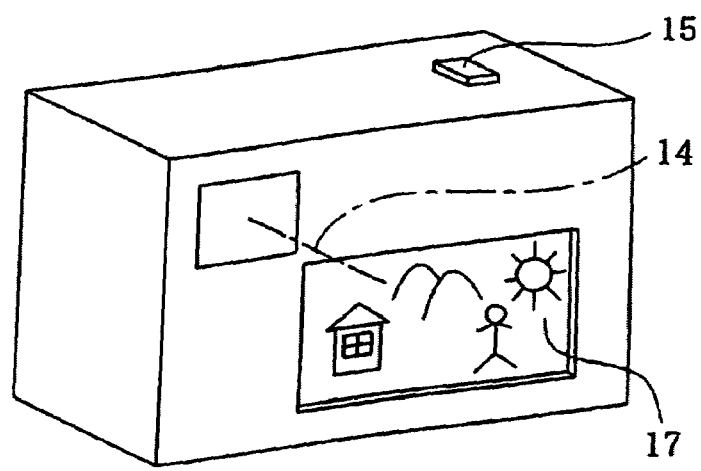

FIG. 10 shows outlined construction of a digital camera in which an image forming optical system according to the present invention is used in a photographing optical system. FIG. 10A is a front perspective view showing appearance of the digital camera and FIG. 10B is a rear perspective view of the same. In FIG. 10, reference numeral 11 represents a photographing optical system having photographing optical path 12, reference numeral 13 is a finder optical system with an optical path 14 for finder, reference numeral 15 is a shutter button, reference numeral 16 is a flush lump and reference numeral 17 is a monitor with liquid crystal display.

When the shutter button 15 arranged on the camera is pressed, in responding such action, photographing is carried out via the photographing optical system 11.

What is claimed is:

1. An image forming optical system comprising in order from an object side;
   a first lens which is a meniscus lens having positive refractive power and a convex surface directed toward an object side;
   an aperture stop;
   a second lens which is a meniscus lens having positive refractive power and a convex surface directed toward an image side; and a third lens having negative refractive power,
wherein the aperture stop is arranged adjacent to the first lens, the second lens is arranged adjacent to the aperture stop, and the third lens is arranged adjacent to the second lens with no intervening lenses.

2. An image forming optical system according to claim 1, wherein at least one of surfaces of the third lens is aspherical and the following condition is satisfied:

$$-2.0 < \Phi m/\Phi p < 0$$

where Φm represents the power of the third lens at the position of the maximum light height and Φp represents the power of the third lens at the position of the near axis.

3. An image forming optical system according to claim 1, satisfying the following condition:

$$-2.0 < (r1r+r2f)/(r1r-r2t) < 1.0$$

where r1r represents the radius of curvature of the first lens at the image side and r2f is the radius of curvature of the second lens at the object side.

4. An image forming optical system according to claim 1, satisfying the following condition:

$$0.1 < r1f/f < 1.0$$

where r1f represents the radius of curvature of the first lens at the object side and f is the focal length of the whole image forming optical system.

5. An image forming optical system according to claim 1, satisfying the following conditions:

$$0.2 < f12/|f3| < 1.5$$

$$0.5 < f/|f3| < 2.0$$

where f12 represents total focal length of the first lens and the second lens, f3 represents the focal length of the third lens and f represents the focal length of the whole optical system.

6. An image forming optical system according to claim 1, satisfying the following condition:

$$-5.0; f1/f23 < 3.0$$

where f1 represents the focal length of the first lens and f23 represents the total focal length of the second lens and the third lens.

7. An image forming optical system according to claim 1, satisfying the following condition:

$$5.0 < (v1-v3)/(v2-v3) < 1.5$$

where v1 represents the Abbe's number of the first lens, v2 represents that of the second lens and v3 is that of the third lens.

8. An image forming optical system according to claim 1, satisfying the following condition:

$$0.4 < EXP/f < 1.5$$

where EXP represents the distance of the exit pupil from an image plane and f is the whole focal length of the image forming optical system.

9. An image forming optical system according to claim 1, satisfying the following condition:

$$0.55(1/\mu m) < Fno/P(\mu m) < 2.10(1/\mu m)$$

where Fno represents the F number fully opened and P represents the pixel pitch of an imaging element which has an imaging plane at the image forming position of the image forming optical system.

10. An image forming optical system according to claim 1, satisfying the following condition:

$$0.05 < ML/TL < 0.35$$

where TL represents whole length of the image forming optical system and ML represents the minimum thickness on the axis of a plastic lens constituting the image forming optical system.

11. An electric device equipped with the image forming optical system of claim 1.

12. An image forming optical system consisting of, in order from an object side:
a first lens which is meniscus lens having positive refractive power and a convex surface directed toward an object side;
an aperture stop;
a second lens which is meniscus lens having positive refractive power and a convex surface directed toward an image side; and
a third lens having negative refractive power.

13. An image forming optical system comprising, in order from an object side:
a first lens which is meniscus lens having positive refractive power and a convex surface directed toward an object side;
an aperture stop;
a second lens which is meniscus lens having positive refractive power and a convex surface directed toward an image side; and
a third lens having negative refractive power,
wherein the aperture stop and all lenses are fixedly positioned.

14. An image forming optical system comprising, in order from an object side:
a first lens which is meniscus lens having positive refractive power and a convex surface directed toward an object side;
an aperture stop;
a second lens which is meniscus lens having positive refractive power and a convex surface directed toward an image side; and
a third lens having negative refractive power,
wherein at least one of surfaces of the third lens is aspherical and the following condition is satisfied:

$$-2.0 < \Phi m/\Phi p\ 0$$

where Φm represents the power of the third lens at the position of the maximum light height and Φp represents the power of the third lens at the position of the near axis.

15. An image forming optical system comprising, in order from an object side:
a first lens which is meniscus lens having positive refractive power and a convex surface directed toward an object side;
an aperture stop;
a second lens which is meniscus lens having positive refractive power and a convex surface directed toward an image side, and
a third lens having negative refractive power,
wherein the image forming optical system satisfies the following condition:

$$-2.0 < (r1r-r2t)/(r1r-r2f) < 1.0$$

where r1r represents the radius of curvature of the first lens at the image side and r2f is the radius of curvature of the second lens at the object side.

16. An image forming optical system comprising, in order from an object side:
- a first lens which is meniscus lens having positive refractive power and a convex surface directed toward an subject side;
- an aperture stop;
- a second lens which is meniscus lens having positive refractive power and a convex surface directed toward an image side; and
- a third lens having negative refractive power,
- wherein the image forming optical system satisfies the following conditions:

$$0.5 < f12/|f3| < 2.0$$

where f12 represents total focal length of the first lens and the second lens, f3 represents the focal length of the third lens and f represents the focal length of the whole optical system.

17. An image forming optical system comprising, in order from an object side:
- a first lens which is meniscus lens having positive refractive power and a convex surface directed toward an object side;
- an aperture stop;
- a second lens which is meniscus lens having positive refractive power and a convex surface directed toward an image side; and
- a third lens having negative refractive power,
- wherein the image forming optical system satisfies the following condition:

$$-5.0 < f1/f23 < 3.0$$

where f1 represents the focal length of the first lens and f23 represents the total focal length of the second lens and the third lens.

18. An image forming optical system comprising, in order from an object side:
- a first lens which is meniscus lens having positive refractive power and a convex surface directed toward an object side;
- an aperture stop;
- a second lens which is a meniscus lens having positive refractive power and a convex surface directed toward an image side; and
- a third lens having negative refractive power,
- wherein the image forming optical system satisfies the following condition:

$$5.0 < (v1-v3)/(v2-v3) < 1.5$$

where v1 represents the Abbe's number of the first lens, v2 represents that of the second lens and v3 is that of the third lens.

19. An image forming optical system comprising, in order from an object side:
- a first lens which is a meniscus lens having positive refractive power and a convex surface directed toward an object side;
- an aperture stop;
- a second lens which is a meniscus lens having positive refractive power and a convex surface directed toward an image side; and
- a third lens having negative refractive power, wherein the image forming optical system satisfies the following condition:

$$0.4 < EXP/f < 1.5$$

where EXP represents the distance of the exit pupil from an image plane and f is the whole focal length of the image forming optical system.

20. An image forming optical system comprising, in order from an object side:
- first lens which is a meniscus lens having positive refractive power and a convex surface directed toward an object side;
- an aperture stop;
- a second lens which is a meniscus lens having positive refractive power and a convex surface directed toward an image side; and
- a third lens having negative refractive power, wherein the image forming optical system satisfies the following condition;

$$0.55(1/\mu m) < Fno/P(\mu m) < 2.10(1/\mu m)$$

where Fno represents the F number fully opened and P represents the pixel pitch of an imaging element which has an imaging plane at the image forming position of the image forming optical system.

21. An image forming optical system comprising, in order from an object side;
- a first lens which is a meniscus lens having positive refractive power and a convex surface directed toward an object side,
- an aperture stop;
- a second lens which is a meniscus lens having positive refractive power and a convex surface directed toward an image side; and
- a third lens having negative refractive power,
- wherein the image forming optical system satisfies the following condition:

$$0.05 < ML/Tf. < 0.35$$

where TL represents whole length of the image forming optical system and ML represents the minimum thickness on the axis of a plastic lens constituting the image forming optical system.

* * * * *